(12) United States Patent
Tomlins (10) Patent No.: US 6,618,383 B1
(45) Date of Patent: Sep. 9, 2003

(54) SERIAL INTERFACE FOR A BROADBAND COMMUNICATIONS NETWORK

(75) Inventor: Andrew G Tomlins, Harlow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/473,723

(22) Filed: Dec. 28, 1999

(51) Int. Cl.[7] .............................................. H04L 12/64
(52) U.S. Cl. ...................... 370/395.5; 370/536; 710/71
(58) Field of Search .......................... 370/395.5, 395.6, 370/395.62, 438, 536; 710/71, 106

(56) References Cited

U.S. PATENT DOCUMENTS

| | | | |
|---|---|---|---|
| 5,293,378 A | * 3/1994 | Shimizu | 370/474 |
| 5,440,550 A | * 8/1995 | Follett | 370/427 |
| 5,444,711 A | * 8/1995 | Mizuguchi et al. | 348/456 |
| 5,452,330 A | * 9/1995 | Goldstein | 375/257 |
| 5,805,588 A | * 9/1998 | Petersen | 370/356 |
| 5,970,068 A | * 10/1999 | Gray et al. | 370/395.5 |
| 5,987,007 A | * 11/1999 | Molin et al. | 370/236 |
| 6,061,354 A | * 5/2000 | Morikawa et al. | 370/395.7 |
| 6,094,439 A | * 7/2000 | Krishna et al. | 370/445 |

OTHER PUBLICATIONS

Nishio. Anew architecture of photonic ATM switches. IEEE Communication Magazine, V. 31, I. Apr. 4, 1993, pp. 62–68.*

* cited by examiner

Primary Examiner—Hassan Kizou
Assistant Examiner—D Levitan
(74) Attorney, Agent, or Firm—Barnes & Thornburg (57) ABSTRACT

A serial interface for interfacing communications traffic, e.g. frame based voice traffic, with a cell or packet based communications network, the interface comprises; a transmit unit and a receive unit, the units being coupled via a first serial line and one or more further serial lines. The transmit unit has packetising means for packing the communications traffic into micro-packets, each having a header portion containing control information and a payload portion. The payloads and control information are transmitted in parallel respectively over the first and further serial lines to the receive unit The receive unit has means for receiving the transmitted payloads and for relating the corresponding control information thereto.

16 Claims, 11 Drawing Sheets

Fig. 1

Fig. 2 dS = Start of μ - packet
dP = μ - packet payload present

Delineation Byte Format

*Fig. 3*

*Fig. 4* Byte alignment algorithm (delineation byte)

Fig. 5

Sequences of bytes erroneously detected as valid but out of phase

Delineation Byte Format and control bit usage

Fig. 8

Control Header Format in 32 bits with no delineation information

ACS Interconnect configuration – Trunking/Interworking only

Fig. 11

ACS Interconnect configuration – Trunking/Interworking and AAL-2 Switching

Fig. 12

SERIAL INTERFACE FOR A BROADBAND COMMUNICATIONS NETWORK

FIELD OF THE INVENTION

This invention relates to arrangements and methods for interfacing frame based communications traffic with a cell or packet based network.

BACKGROUND OF THE INVENTION

Traditionally, two types of legacy telecommunication networks have been developed. The first type is connection oriented and is used for the transport of narrow band voice traffic, typically carried in TDM frames. Such networks comprise for example synchronous or plesiochronous networks.

Digital telecommunication systems are currently evolving from the so-called first generation of narrow band networks, which were primarily directed to the handling of voice and data traffic, to a new generation of broad band networks which can carry a full range of multimedia services. Within a typical narrow band network, traffic and control information are carried in 64 kbit/s bearer channels using time division multiplexing (TDM). Routing to establish communications channels between end users.is determined by the network nodes each of which is provided with a set of routing tables so as to set up an optimum route for each communication. A great deal of this narrow band, typically voice, traffic is transported via the synchronous digital hierarchy (SDH) or the equivalent North American SONET protocol. Further legacy systems employ the plesiochronous digital hierarchy (PDH). In such systems, digitised traffic from a large number of users is packed into virtual containers which are multiplexed up into synchronous or plesiochronous frames prior to transmission. There is thus a problem in adapting this synchronous or plesiochronous frame based bulk traffic for transport over a cell or packet based asynchronous broadband network. The second type of legacy network is connectionless in nature and is used for the transport of broad band packet or cell-based data traffic. There is currently a drive towards unified networks which provide end to end transport for both voice and data services. However, as there is a well established voice network base, network operators are naturally reluctant to replace such legacy networks. This issue has been addressed by providing broad band (asynchronous) overlay networks which interface with the established TDM networks to provide a voice and data transport functiori. At the interface between the two networks, an interface function maps TDM frames into packets or Asynchronous Transfer Mode (ATM) cells and vice-versa. ATM is of course just one example of a packet based network.

A goal of development of telecommunications networks is to realise the potential integration of real-time and non-real-time services. The key examples of these two types are voice telephony (real-time) and computer data (non-real-time). Voice telephony is served predominantly by circuit switched connection orientated networks that are arranged to deliver a guaranteed quality of service. Such networks are implemented by transport and switching systems that use a time division multiplex of circuits. Computer data is served predominantly by the Internet which uses a packet forwarding connectionless mode of operation or Internet protocol (IP), that is a workable paradigm best suited to the burstiness of traffic demand and general non-deterministic nature of this traffic type.

ATM (asynchronous transfer mode) has been designed from the outset to adapt to many different types of communications traffic. ATM is a connection orientated network mechanism, allowing dynamic bandwidth configuration and flexibility as a key advantage over circuit switched networks. ATM has adaptation layers for carrying given services over ATM transport and switches. However, the fixed length of ATM cells, while suitable to segmentation of long data packets, thereby simplifying and streamlining switching technologies, is still too large for certain compressed voice services, that suffer a cell assembly or 'cellification' delay affecting existing network delay budgets and acceptable voice characteristics.

This issue has been addressed by the definition of Adaptation Layer 2 (AAL2). This is distinct from other ATM adaptation layers, since it de-couples voice packets from ATM cell boundaries, and provides for the multiplexing of mini-packets from several calls into a single ATM connection. This multiplex is asynchronous to the cell boundary and effectively introduces a new switching layer above the ATM layer.

Beyond the ability to switch in these adaptation layers and to interwork between them, is the requirement to trunk to legacy TDM and packet based networks. The various demands of IP and ATM adaptation layers, and the likelihood that both IP and ATM technologies will be deployed in the near term for both real-time and non-real-time services, has demonstrated a need for the integration of these technologies.

As mentioned above, a particular problem with voice traffic is that of minimising the cell assembly delay at the adaptation interface equipment in order to maintain the required quality of service. Interconnects currently used for packets within equipments are generally designed for use with fixed length packets or cells, e.g. ATM cells sometimes augmented with additional header or trailer bytes. Such an interconnect is the ATM Forum standard UTOPIA bus. The carriage in such systems of short variable length packets, e.g. AAL-2 that is commonly used for voice traffic, is possible only by padding them out to the full size with null data, and is thus inefficient of bandwidth.

SUMMARY OF THE INVENTION

An object of the invention is to minimize or to overcome the above disadvantage.

According to a first aspect of the invention, there is provided a method of interfacing communications traffic with a cell or packet based communications network, the method comprising segmenting the communications traffic into micro-packets each consisting of a payload and a header containing control information, and transmitting said payload and control information in parallel over separate serial lines.

According to another aspect of the invention, there is provided a serial interface for interfacing communications traffic with a cell or packet based communications network, the interface comprising; means for segmenting the frame based traffic into micro-packets each consisting of a payload and a header containing control information, and means for transmitting said payload and control information in parallel over separate serial lines.

According to a further aspect of the invention, there is provided an interface arranged to convey variable length voice and data information packets between processing devices in an asynchronous adaptation arrangement, wherein the voice and data information packets are conveyed in a serial manner within micro-packets whereby to obviate the use of null or padding data.

According to a further aspect of the invention, there is provided a method of conveying variable length voice and data information packets over an interface between processing devices in an asynchronous adaptation arrangement, wherein the voice and data information packets are conveyed in a serial manner within micro-packets whereby to obviate the use of null or padding data.

According to another aspect of the invention, there is provided a serial interface for interfacing communications traffic with a cell or packet based communications network, the interface comprising; a transmit unit, a receive unit, a first serial line and one or more further serial lines therebetween, wherein the transmit unit has packetising means for packing the communications traffic into micro-packets, each having a header portion containing control information and a payload portion, first serial transmission means for transmitting the payload portion of each said micro-packet over the first serial line to the receive unit, and further transmission means for transmitting the control information over the one or more further serial lines to the receive unit, and wherein the receive unit has means for receiving the transmitted payload and for relating the transmitted control information thereto.

According to a further aspect of the invention, there is provided a method of interfacing communications traffic with a cell or packet based communications network, the interface comprising; a transmit unit, a receive unit, a first serial line and one or more further serial lines therebetween, wherein the method comprises packetising the communications traffic into micro-packets, each having a header portion containing control information and a payload portion, transmitting the payload portion of each said micro-packet over the first serial link to the receive unit, and subsequently relating the transmitted payload and control information.

The arrangement and method provide a means of transmitting the payloads of ATM cells, AAL2 Common Part Sublayer (CPS) packets, IP packets or other packet types, together with necessary control information, using a common generic format between devices in an ATM/IP adaptation environment.

The interconnect by using a serial format permits a high bandwidth, typically 622 Mbit/s, of packet traffic to be transmitted using a small number of signal lines, thus facilitating multiple interconnects to be configured per device for scalability purposes. It also minimizes space on a Printed Circuit Board (PCB) taken by high pin-count devices and tracks, as well as minimizing power consumption.

The interconnect by providing a common generic format for the different types of packet associated with connection oriented or connectionless services, allows these packet types to be handled by the same devices without a multiplicity of different interconnects.

The interconnect is adapted to handle variable length packets, including very short packets and packets of which the length varies dynamically on any given channel, and so can carry AAL-2 and IP packets in a bandwidth efficient manner as for that of fixed length ATM cells.

The interconnect has a generic segmentation and reassembly (SAR) capability, in which the segments can be variable in length. This allows packets of any length including long IP packets to be carried efficiently.

The generic SAR capability together with the ability to carry very short packets or segments of packets, enables the segmentation of ATM cells and other medium length packets into very short fragments. This allows payload data buffering to be concentrated in one place whilst minimizing data storage elsewhere, enabling a memory efficient architecture for the adaptation functional circuitry to be used. It also obviates the need for padding with null information to minimize assembly delay.

BRIEF DESCRIPTION OF THE DRAWINGS

An exemplary embodiment of the invention will now be described with reference to the accompanying drawings in which.

DESCRIPTION OF PREFERRED EMBODIMENT

Figure 1:
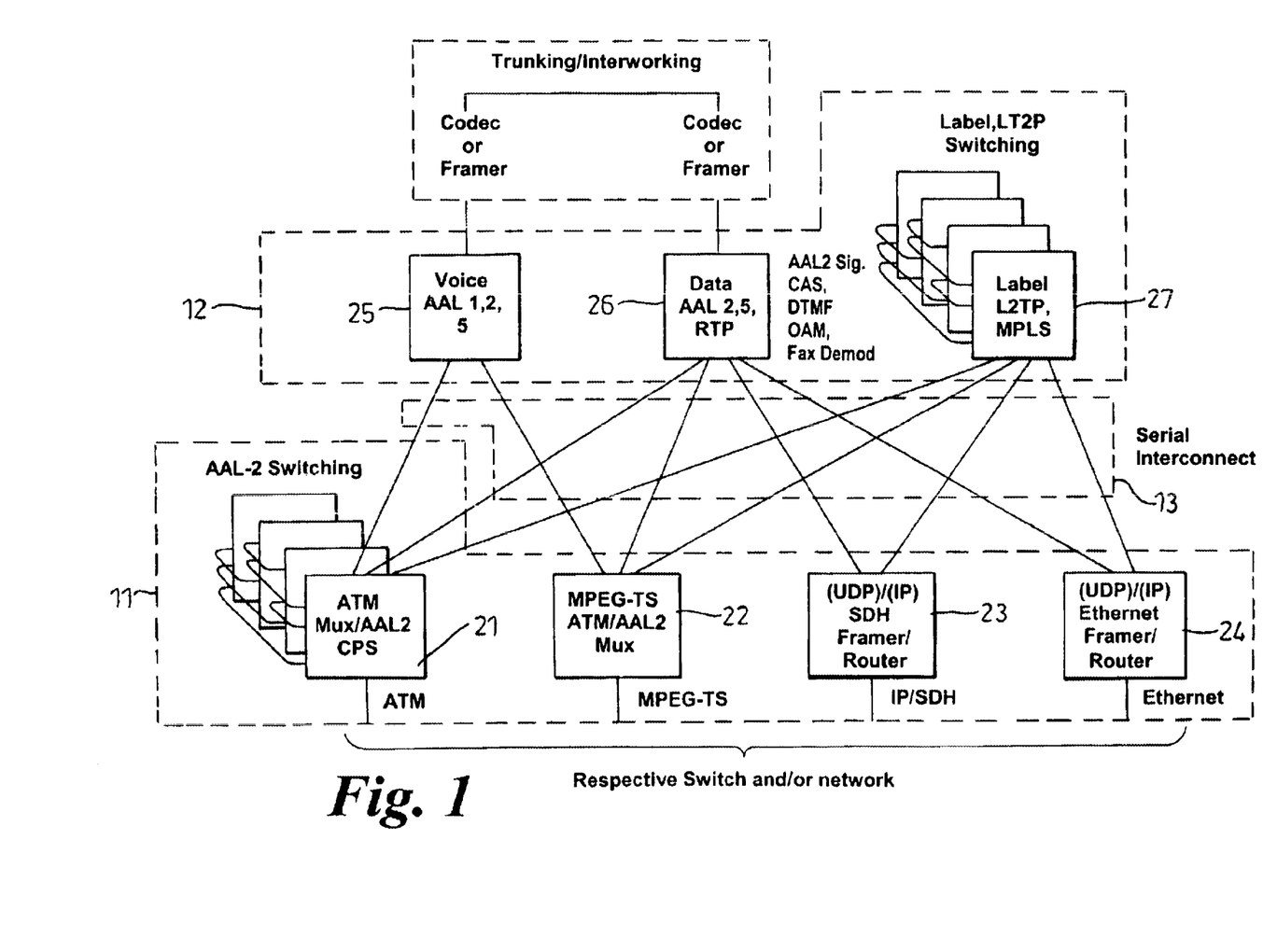
FIG. 1 is a schematic diagram illustrating the interfacing of a number of networks with a broadband transport network.

Referring first to FIG. 1, the figure shows in schematic form an ATM/IP interface arrangement consisting of a family of devices that comprises two groups. The first group 11 comprises devices that perform multiplexing, segregation and routing field translation for the respective traffic type. These devices may also remove or substitute an outermost layer of encapsulation. These devices are bi-directional and ideally output buffered with respect to the network indicated in the figure. The second group 12 comprises devices that perform format conversions between the service payload (voice, video or data) and an adaptation layer control format. These devices are also bi-directional, and buffering depends on the particular function, e.g. real-time, segmentation.

The interface generally indicated as 13 between devices of the two groups accommodates the transference of arbitrary and variable length packets. This interface provides the means to interconnect devices of any type, either by mutual interconnection or self interconnection. One or more instances of a single device may be connected to perform a switching function, or routing and removal of nested encapsulation of given adaptation layer. Such an arrangement may be scaled by bandwidth or number of connections, limited only by the addressing capabilities of its tables and the number of serial links over which it may multiplex or segregate traffic. Instances of different devices of the same or of different groups may be connected to switch, trunk, inter-work, and route and remove nested encapsulation of one or more adaptation layers.

The common interface format provides flexibility and an opportunity to extend the type of devices in this architecture. The buffer apportionment for a given device will depend on its purpose and the service type, but will take account of the services with which it may be multiplexed and the devices with which it may be configured.

Advantageously, the arrangement of FIG. 1 is provided in the form of an integrated circuit chip suite.

FIG. 1 shows by way of example instances of devices suitable for ATM and IP adaptation layers. However, it will be understood that the architecture is not limited to the devices shown, or to just ATM and IP.

In FIG. 1, the first group 11 of multiplexing devices includes an ATM/AAL2 multiplex 21, a Moving Picture Exports Group-Transport Stream (MPEG-TS) multiplex 22, an IP over SDH framer/router 23, and IP over Ethernet devices 24, and Multi-Protocol Label Switching (MPLS) label devices. All these devices perform a multiplexing/segregating function based on a connection/tunnel identifier, label or destination address, and use the generic interface 13 to produce arbitrary but fixed length packets, up to a maximum but short length. Long IP packets for example are segmented when carried on the interconnect, with a indication of the last segment of the packet. ATM cells are sufficiently short for them not to require segmentation. Segments may be stored and reassembled or directly switched on receipt.

For example, the ATM/AAL-2 Mux device can:

remove or add the ATM header, and if AAL-2, the AAL-2 CPS header;

segregate or multiplex at the ATM level or additionally the AAL-2 level.

route on the VPI and VCI of the ATM header, or additionally on the Circuit Identifier (CID) of the AAL-2 header.

Buffer payloads and control information before output to the network side. This arrangement is suitable for the statistical multiplexing of payloads at the ATM or additionally AAL-2 level. The multiplexing may be of payload from a single, even the same device, or several devices.

The MPEG-TS device performs similar function to the ATM/AAL-2 device, however the services may be AAL-2 in ATM in MPEG-TS, ATM in MPEG-TS or AAL-2 directly in MPEG-TS. The objective of the device would be to process the MPEG-TS header routing information and add or remove the MPEG-TS header to ATM, AAL-2, or AAL-2 in ATM as appropriate. Although shown separately, those skilled in the art will appreciate that this function may be integrated with the ATM/AAL-2 Multiplex if desired.

The IP over SDH or IP over Ethernet devices perform functions appropriate to IP:

remove or add the IP header, and if appropriate the User Datagram Protocol (UDP) or Transmission Control Protocol (TCP) headers;

segregate or multiplex IP packets at the IP level, the transport layer (UDP/TCP) or the packet payload for nested protocols as appropriate;

route on the IP destination address, the UDP or TCP port identifiers, or by default if transporting nested Layer Two Tunnelling Protocol (L2TP). The IP layer may be optional if the SDH/Ethernet is transporting Point to Point Protocol (PPP), L2TP or MPLS directly, in which case the routing may be optional or by default for further processing in the label device;

segment long packets for the generic interface short packet requirement, and reassemble on receipt of segments. An output buffer to the network may be it implemented for segment reordering if necessary and not performed elsewhere, or for priority multiplexing or routing table lookup delay.

The label device can be designed to perform functions appropriate to L2TP, PPP, Point to Point Tunelling Protocol (PPTP) and MPLS, for example:

remove or add a L2TP, PPP, PPTP or MPLS header;

segregate or multiplex packets by routing derived from the tunnel identifier and call identifier of L2TP and PPTP, connection identifier of PPP, or label of MPLS;

buffer segments to concatenate segments received on the generic interface to prevent packet interleaving if necessary, or for differentiating connection priorities.

remove or add AAL-5 trailers and padding if communicating with the ATM/ML-2 device.

The three devices just described can intercommunicate to create interworking between payloads carried in the adaptation layers just described, most significantly between ATM adaptation layers and IP. The devices can also interwork by for example encapsulating L2TP in AAL-5 in ATM, or IP in AAL-5 in ATM in MPEG-TS. All standards compliant nested protocols are preferred and possible.

In a similar manner, the label device may be cascaded to perform label or tunnel and call switching. The same device may be connected in several layers to add or remove, and perform switching at several nested layers of labels or tunnels. This is suitable for MPLS and L2TP that may have several levels of encapsulation.

The second group 12 of format conversion and service interface devices comprises the voice and data devices. The voice device 25 performs conversion between for example ITU-TG series codecs and ATM adaptation layers (AAL) 1, 2 and 5, processing all the controlling fields of these adaptation layers. The payloads transferred on the generic interface are derived from the payloads of ATM cells and/or AAL-2 packets and termed service data units (SDUs). The voice device 25 adds or removes the control fields of the SDUs and interfaces to the codec service or respective network interface. This particular application is termed trunking.

The codec service may be looped back through the voice device 25. This facility enables interworking between ATM adaptation layers. The voice device also buffers packets on its input side from the ATM network, so that for these real-time services it can absorb the timing jitter induced by ATM networks. On the output side towards the ATM network, the device need not use buffering; the ATM/AAL-2 Multiplex device for example may use its output buffering to store packets for statistical multiplexing.

The data device 26 performs conversion between data packets of for example IP, Frame Relay and AAL-2 frame mode data (I.366.1 SSTED), AAL-5 frame SAR (I.363.5), as well as the AAL-2 Channel Associated Signalling (CAS), Dual Tone Multiple Frequency (DTMF) and facsimile (Fax) demodulation out-of-band (OOB) mechanisms (I.366.2), processing all the controlling fields of these adaptation layers. In addition it may perform conversion between ITU-T G series codecs and the Internet Engineering Task Force (IETF) real-time Protocol (RTP—RFC 1889, H.225.0). It may also perform conversion or create AAL-2 OAM flows and AAL-2 connection control. The data device may perform concatenation of payloads, and segmentation of packets for the generic interconnect. Consequently it may use buffering on its input and output side with respect to the network. Furthermore, flow control may be avoided by traffic shaping to ensure that a bursty data source conforms to a real-time, fixed bandwidth behaviour, such that it may be multiplexed by the ATM/AAL-2 Multiplex with traffic from the voice device. The data and the voice devices may communicate via the service interface and optional signal processors to perform RTP to ATM ML interworking.

The combination of the voice and ATM/AAL-2 Multiplex devices provides full ITU-T and ATM Forum standards compliance for AAL 1, 2 and 5 voice services, with the capability to perform trunking to/from packet and TDM transmission, and interworking between adaptation layers. The ATM/AAL-2 Multiplex ASIC may be deployed independently to support the AAL-2 relay switching function.

Figure 2:
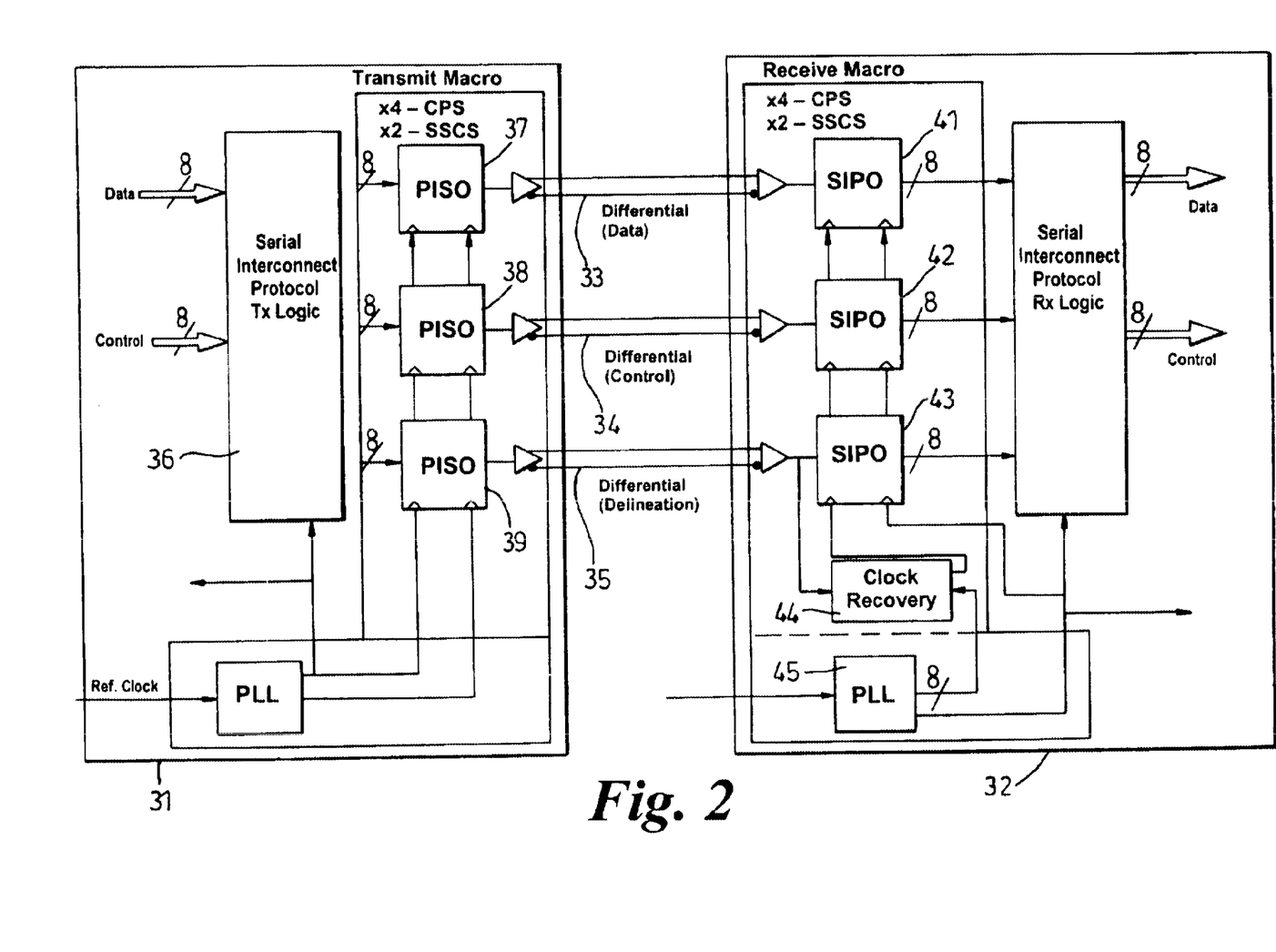
FIG. 2 shows an interface construction for use in the network of FIG. 1.

Referring now to FIG. 2, this shows the construction of a serial interface for use in the arrangement of FIG. 1. It will be appreciated that, for clarity, only one traffic direction from TDM to ATM is shown. The reverse direction will of course be provided with a similar arrangement.

The arrangement comprises a transmit unit 31 and a receive unit 32 coupled by first, second and third serial lines, 33, 34 and 35 respectively. On the transmit side, the date and control information are fed via a serial interconnect protocol transmit logic circuit 36 to parallel-in-serial-out (PISO) circuits (transmit interface macros) 37, 38 and 39 which output to the respective serial lines 33, 34 and 35. Advantageously, the serial lines carry differential data. Synchronization of the control and date information is provided from the system clock in a phase locked loop (PLL) timing control 30. In the arrangement of FIG. 2, the control and delineation information is carried on serial lines 34 and 35 respectively. However, in some applications, the control and delineation information can be carried on a single serial line.

On the receive side, the received payload and control date is fed to respective serial-in-parallel-out (SIPO) circuits (receive interface macros) 41, 42 and 43, and is synchronized with unit clock recovery circuit 44 and a phase locked loop 45 driven from the system clock. Output from the interface is effected via serial instrument protocol receive logic circuit 46.

A common clock signal e.g. at 19.44 MHz is fed to all devices interconnected using the serial interconnect. This is frequency multiplied by a phase-lock loop circuit in each device to obtain the 622.08 MHz operating frequency. The transmitting and receiving ends of each link will thus be frequency synchronous; however, the relative phase will be unpredictable depending on the various PCB track lengths involved. The three lines of each link are routed closely together with closely matching lengths so that any differences in delay are much less than the serial data bit period.

At the receiving end of a link, the clock phase is extracted from the delineation line by circuitry in the device serial interface macro using the method known as phase delay lock loop (PDLL), and this clock phase is applied to all three lines. The content of the information on the delineation is guaranteed, using the data formats discussed below, to have a sufficient frequency of transitions Zero to One, or One to Zero to ensure satisfactory operation of the PDLL.

Figures 3, 4:
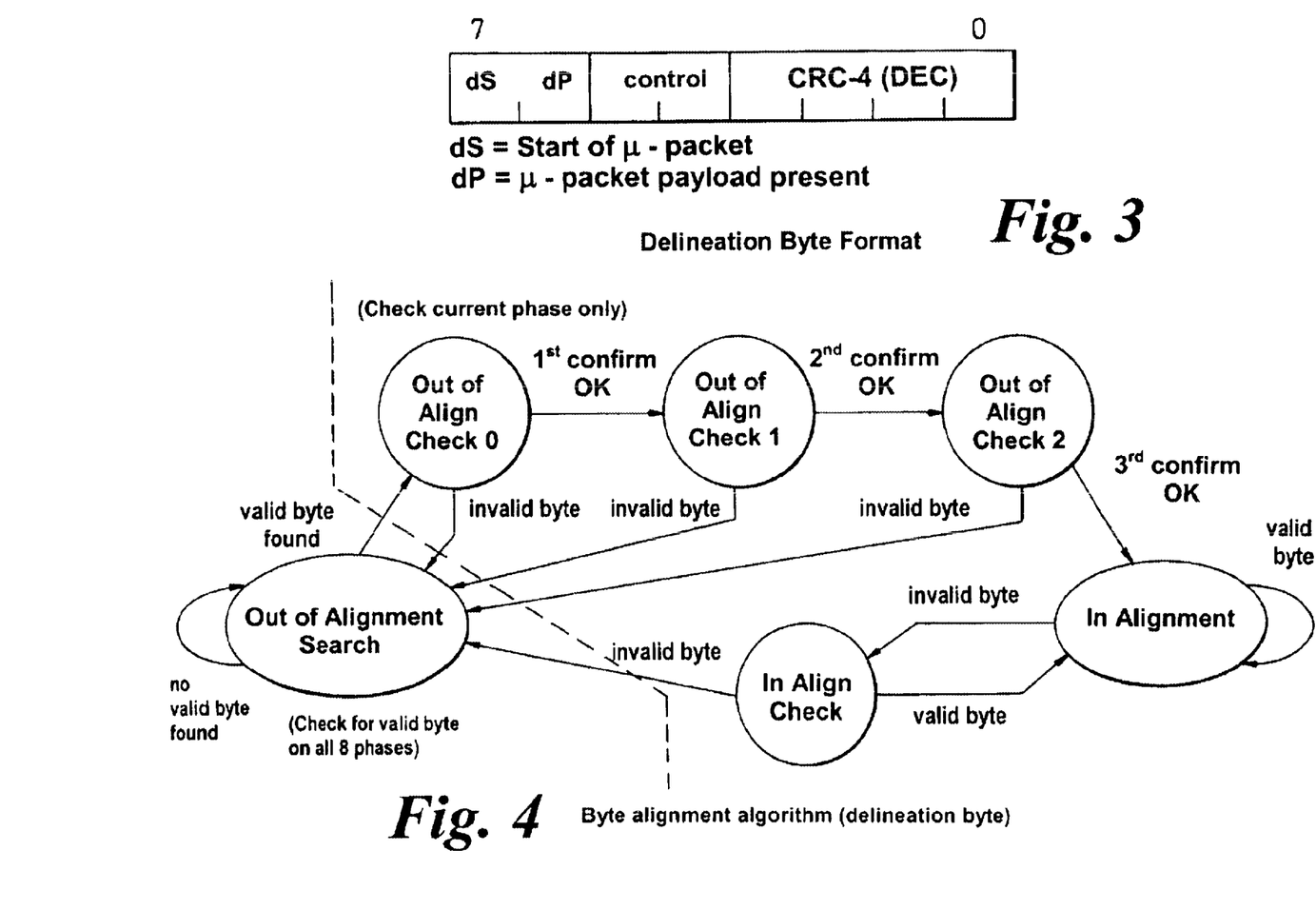
FIG. 3 shows a delineation byte format for micro-packet transmission over the interface of FIG. 2.
FIG. 4 illustrates a method of byte alignment over the interface of FIG. 2.

Data is transmitted on each link in an eight-bit byte orientated manner. Every byte sent on the delineation line conforms to the same format. Two bits, a start time of micro-packet bit (dS) and a micro-packet payload present bit (dP), carry micro-packet delineation signals indicating respectively the start of the micro-packet and the presence/absence of a payload. A further two bits carry other control information, and the remaining four bits are generated dependent on the pattern of the first four bits in accordance with the rules for a cyclic redundancy check sum (CRC). The format of the delineation byte is shown in FIG. 3.

The rule for the generation of the four-bit CRC is as follows: the four-bit delineation byte CRC is calculated over the first four bits (7-4) of the delineation byte. The CRC-4 is defined as the remainder (modulo 2) after multiplication by $x^4$ and division by the polynomial $x^4+x+1$. The CRC bits are placed in CRC-3 field in the conventional order but inverted. The inverse of the most significant bit (MSB) of the CRC, $C_1$, is placed in bit 3 of the delineation byte; the inverse of the least significant bit (LSB) of the CRC, $C_4$, is placed in bit 0 of the delineation byte. This is shown in tabular form in Table 1 below.

TABLE 1

| Function | Information Bits | CRC-4 | Hex |
|---|---|---|---|
| Idle | 00 00 | 1111 | 0F |
|  | 00 01 | 1100 | 1C |
|  | 00 10 | 1001 | 29 |
|  | 00 11 | 1010 | 3A |
| Rest of µ-packet | 01 00 | 0011 | 43 |
|  | 01 01 | 0000 | 50 |
|  | 01 10 | 0101 | 65 |
|  | 01 11 | 0110 | 76 |
| Null byte | 10 00 | 0100 | 84 |
|  | 10 01 | 0111 | 97 |
|  | 10 10 | 0010 | A2 |
|  | 10 11 | 0001 | B1 |
| Start of µ-packet | 11 00 | 1000 | C8 |
|  | 11 01 | 1011 | DB |
|  | 11 10 | 1110 | EE |
|  | 11 11 | 1101 | FD |

These CRC bits enable the eight-bit byte alignment to be correctly determined at the receiver, as well as providing a means of detecting bit errors on the delineation line. The receiver in order to find the correct byte alignment of the eight possible alignments presumes a temporary alignment and calculates the CRC bits in the same way as the transmitter. If this calculated CRC pattern matches the received bits a provisional alignment is gained. If there is no match another of the eight possible phases is tried and the procedure repeated and so on until a match is detected. The circuitry can be designed to check all eight possible phases simultaneously rather than in a serial fashion, to reduce alignment time.

Figure 5:
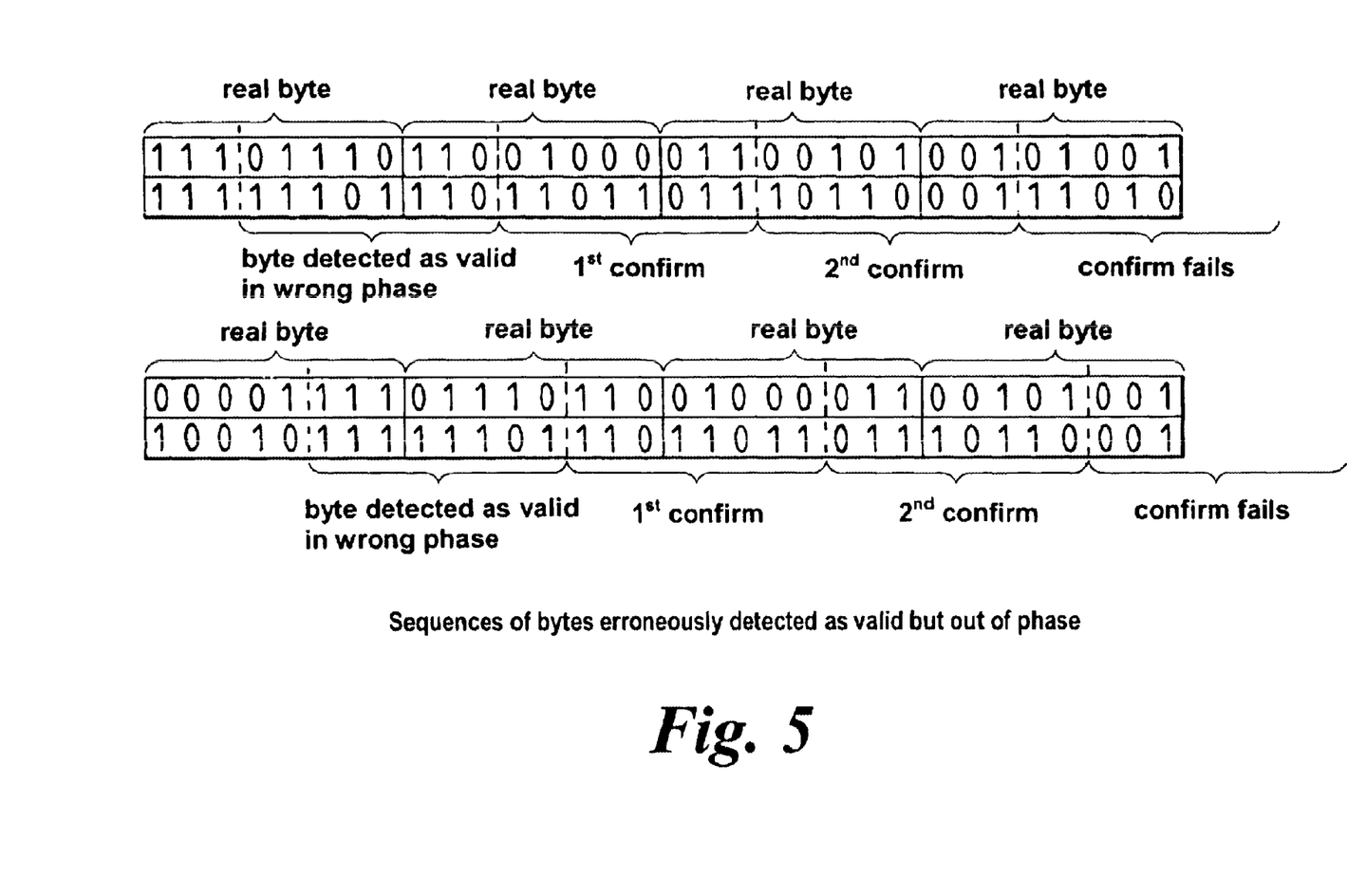
FIG. 5 illustrates the operation of the method of FIG. 4 in detecting byte misalignment.

Once a provisional alignment is gained subsequent bytes are checked to either confirm the alignment or restart the search if no match is obtained. The preferred alignment algorithm is shown in FIG. 4. The longest sequence of bytes which can be detected as valid but in the wrong phase is three bytes as shown in FIG. 5—the alignment algorithm has a sufficient number of checking steps to avoid a temporary false declaration of alignment in these cases.

Given the chosen pattern of the CRC bits there are two theoretical cases where the alignment algorithm could gain false alignment: in Table 1 the valid byte $EE_{Hex}$ when repeated continuously could lead with a 50% probability to false alignment with a four-bit phase error; and there is just one sequence of 15 bytes;

0F, DB, 1C, 84, 3A, 29, 76, 50, FD, B1, C8, 43, A2, 97, 65, . . . , which if repeated continuously could lead similarly to false alignment with a four-bit phase error. However, considering the definition of the serial interconnect protocol, as will be described below, these cases will not occur in practice. The byte $EE_{Hex}$ corresponds to start-of-m-packet and m-packet length=33–48 bytes, and therefore this byte will never be sent repeatedly in consecutive bytes; nor will the above sequence of 15 bytes ever occur in practice.

Micro-Packet Delineation

The bytes of each micro-packet are always sent contiguously with the single exception of "null" bytes when no information at all is sent on the link. Successive micro-packets can be sent abutting or with a gap of an arbitrary number of bytes, termed "idle" bytes.

A micro-packet comprises a four-byte header on the control line and one or more packet payload bytes on the payload line, where the first payload byte coincides with the first header byte. In this way a micro-packet takes a minimum of four bytes on the link (although there may be fewer payload bytes). One or more "null" bytes can be inserted anywhere in the byte stream, which except for timing purposes are ignored at the receiver.

Figure 6:
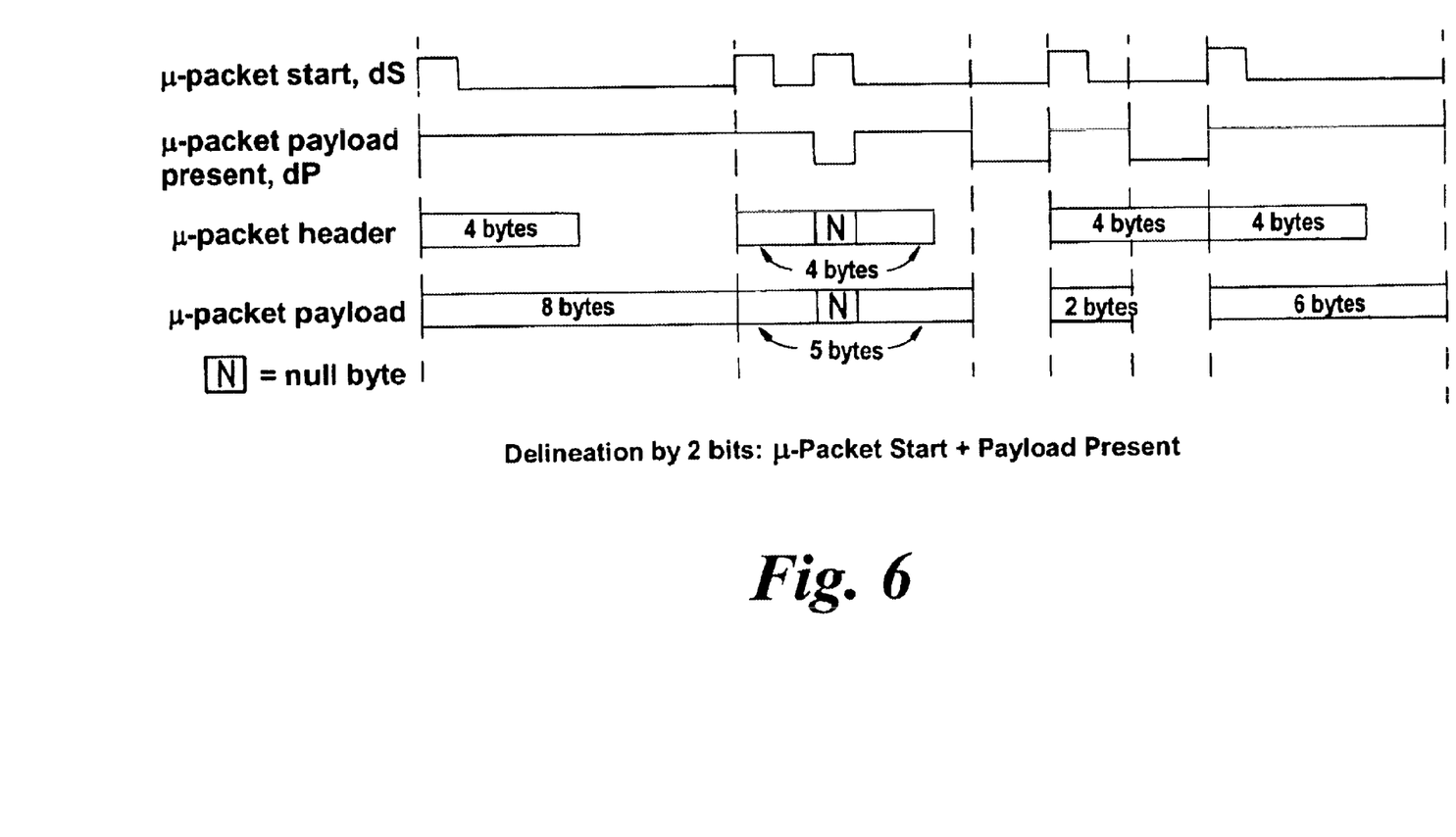
FIG. 6 is a timing diagram illustrating the delineation process.
Figure 7:
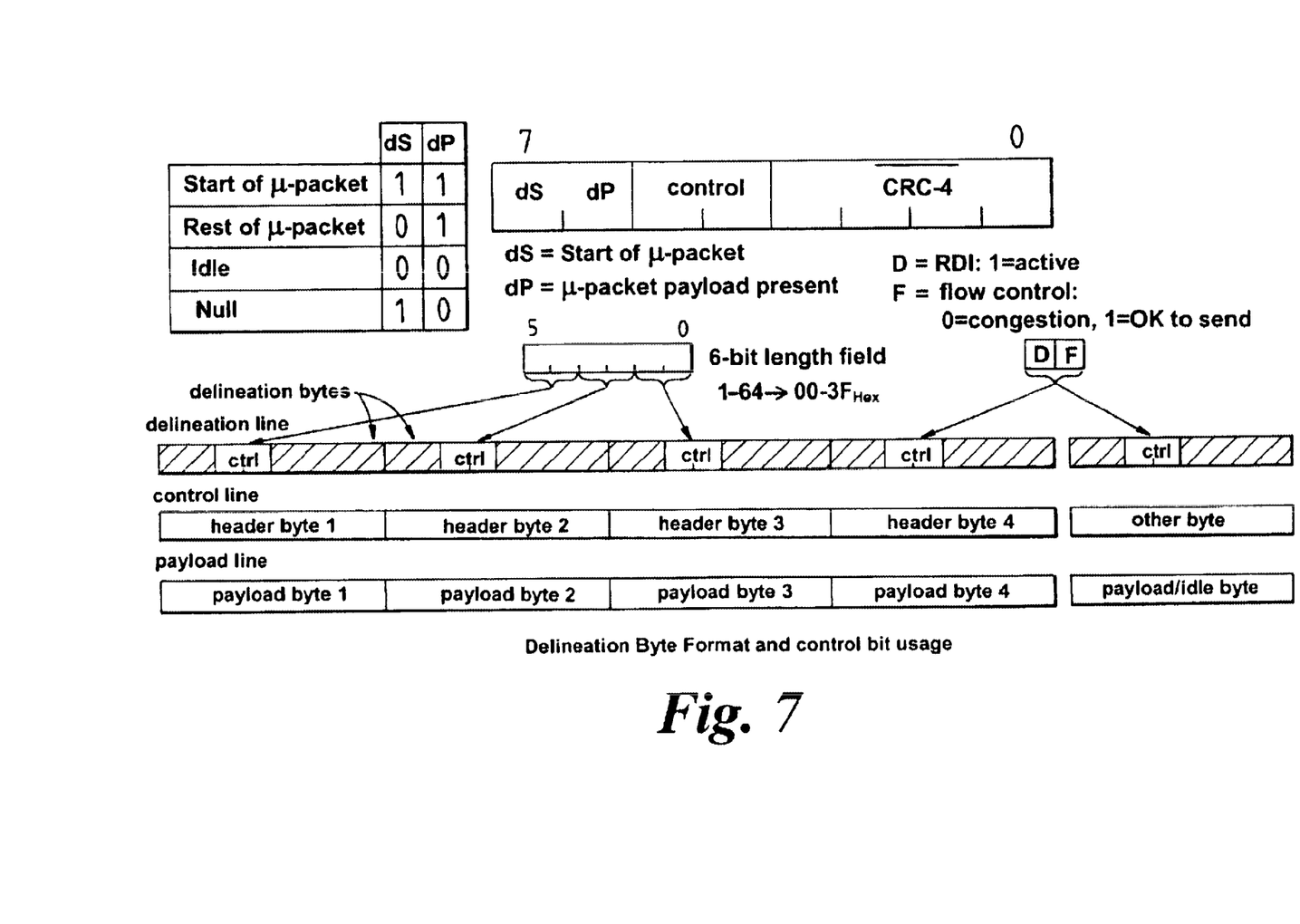
FIG. 7 shows the delineation byte format and the control bit usage.

The delineation of micro-packets on the link in accordance with the above rules is indicated by two signals, 'm-packet start' (dS) and 'm-packet payload present' (dP), as shown in FIG. 6, which are sent in the first two bits respectively of each byte on the delineation line. The two bits effectively identify each byte on the link to be in one of four states: start of m-packet, rest of m-packet (payload), idle, or null, as shown in FIG. 7. The final byte of a micro-packet payload is the last byte of a contiguous set of bytes starting with 'start of m-packet' and the rest being 'rest of m-packet', preceding an 'idle' byte. Note that for packets with less than four bytes of payload, the final header bytes are designated 'idle'.

The above two signals define the position (start, length, end) on the link of micro-packets of any size. For micro-packets with up to 64 bytes payload the end of the micro-packet payload can be alternatively determined at the receiver using the 'start of m-packet' indication and the six-bit explicit length field sent in bits five and four of the delineation byte during the first three bytes of the m-packet, as shown in FIG. 6. The payload length is signalled as a binary value, with the MSB transmitted first, equal to one less than the actual number of bytes, i.e. lengths 1–64 are sent as 00–3F$_{Hex}$. It is up to the designer to determine which method to use and what action is taken when bit errors result in conflicting delineation information.

On all other bytes except "null" bytes bits five and four of the delineation byte are designated D and F bits and used for flow control and remote defect (RDI) indications as shown in tabular form in Table 2 below and shown in FIG. 6.

TABLE 2

| Function | D, F bits |
|---|---|
| No alarm, OK to send | 01 |
| No alarm, congestion | 00 |
| RDI, congestion status = don't care | 11 |
| Not used (reserved) | 10 |

All control information not carried in the delineation byte is carried in the four-byte micro-packet header.

Multiplexing

To distinguish packets of multiple simultaneous connections, channels are identified by the Access Channel Slot (ACS) Local Connection Identifier (LCID) carried in the micro-packet header. The LCID field has 14 bits, corresponding to 16,384 channels per link.

User SDU Length/Delineation

The user SDU, ATM, AAL-2-CPS, or IP, when segmented into two or more link micro-packets is delineated by two of the states of the two 'partial/full/discard' (PFD) bits in the micro-packet header, as further described below: one state (01) means there are more micro-packets to come for the same user SDU; the other state (10) indicates that this is the last micro-packet of the user SDU. The next micro-packet of that LCID is the start of the following SDU. This is analogous (but not synonymous) to the use of the Auxiliary User to User (AUU) bit in the AAL-5 SAR layer.

Early Micro-packet Discard

If a device has started to send fragments of user SDUs over a serial link and an upstream anomaly or defect, e.g. ATM cell loss in an AAL-2 VCC, is detected before the complete SDU is available, a final micro-packet is sent indicating that this and all previous fragments of the same SDU, should be discarded, i.e. an early packet discard function (EPD).

It does not matter if this was a micro-packet with more to follow or the last micro-packet, and so EPD is indicated by a third,state (11) of the PFD bits. The fourth state (00) is not currently used but is reserved for possible future use.

A fault condition on the link is more likely to give the states 11 or 00 than the usual states 01 or 10. By discarding on detection of 11 or 00, faulty data is less likely to propagate undetected.

Per ATM/AAL-2 SDU information: UUI

The five-bit AAL-2 UUI header field or the three-bit PTI field and the one-bit CLP bit in the ATM header are generated/terminated along with the SDU payload in the Service Specific Convergence Sublayer (SSCS) function device but are required by the AAL-2 or ATM header generation/termination function in the CPS device. The five-bit Auxiliary User-to-User Information (AUUI) field is provided in the serial link header to allow these fields to be carried on the serial link.

F5 OAM cell Identification

ATM VC-level OAM flows, i.e. F5 cells will be terminated typically on an ATM layer device beyond the CPS device. In cases where this is not supported, it is desirable to be able to pass these cells across a serial link to/from an SSCS data device handling OAM.

For AAL-0, AAL-1, and AAL-5 traffic, which are handled as ATM-SDUs, the F5 ATM OAM cells can be identified by the PTI field, which is to be carried in the AUUI field of the m-packet header. Provided the PTI field is carried in every m-packet, these F5 cells may be fragmented in whatever way is convenient, whilst using the same LCID as the rest of the VC, and still be readily identified.

However, for AAL-2 the ATM-VC is broken out into a number of AAL-2 mini-cell connections, identified on the serial link by LCIDs. The five-bit AUUI field is used entirely for the AAL-2 UUI field, all values of which are either used or reserved for future standardization. In order to re-use the LCID of one of the component AAL-2 connections of the ATM-VC, F5 OAM cells are identified by a separate bit defined for this purpose in the m-packet header.

Delineation Line

Errors on the delineation line can be detected using the delineation error check (DEC) field, i.e. the CRC bits, of the delineation byte as described above.

A single error causes unreliable m-packet delineation signals, and so should result in discard of the current m-packet. More than one errored byte results in a fresh search for byte alignment in accordance with the byte alignment algorithm as shown in FIG. 5.

Control Line

Bit errors on the control line may be detected by means of a header error check (HEC). The HEC enables detection of all single and double bit errors.

The HEC is a three-bit CRC calculated over all four header bytes on the control line, i.e. the 32−3=29 non HEC bits of the header. The CRC-3 is defined as the remainder (modulo 2) after multiplication by $X^3$ and division by the polynomial $x^3+x+1$. The CRC bits are placed in HEC field in the conventional order: the+MSB of the CRC, C1, is placed in bit 2 of the header; the LSB of the CRC, C3, is placed in bit 0 of the header.

Bytes on the control line which are not header bytes are 'don't care' and are ignored at the receiver.

A header detected in error implies unreliable LCID information and so should result in discard of the affected m-packet.

Payload Line

The payload line error check (PEC) is a three-bit CRC calculated over all bytes (payload & idle) excluding null bytes of the immediately preceding m-packet on the payload line. It is calculated in the same way as the HEC.

Summary of Header Bit Allocation

Table 3 below gives a summary of the control functions of the m-packet header and the number of bits required.

TABLE 3

| Function | Chosen Budget |
|---|---|
| Local Connection identifier (LCID) | 14 |
| Partial/Full/Discard: | 2 |
| End-of-SDU Packet, Early Packet Discard | |
| F5 ATM OAM cell indication | 1 |
| Link Control: | 0[a] |
| Flow Control, Remote Defect Indication | |
| Header Error Check (HEC) | 3 |
| Payload Error Check (PEC) | 3 |
| User-User Information (UUI) | 5 |
| Total (excluding delineation) | 28 |
| Delineation/Fragment Length | 0[a] |
| Total (including delineation bits) | 28 |
| Reserved or future use | 4 |
| Total Available | 32 |

[a]information carried on the delineation line

Configurations of Devices and Interconnect

Figure 8:
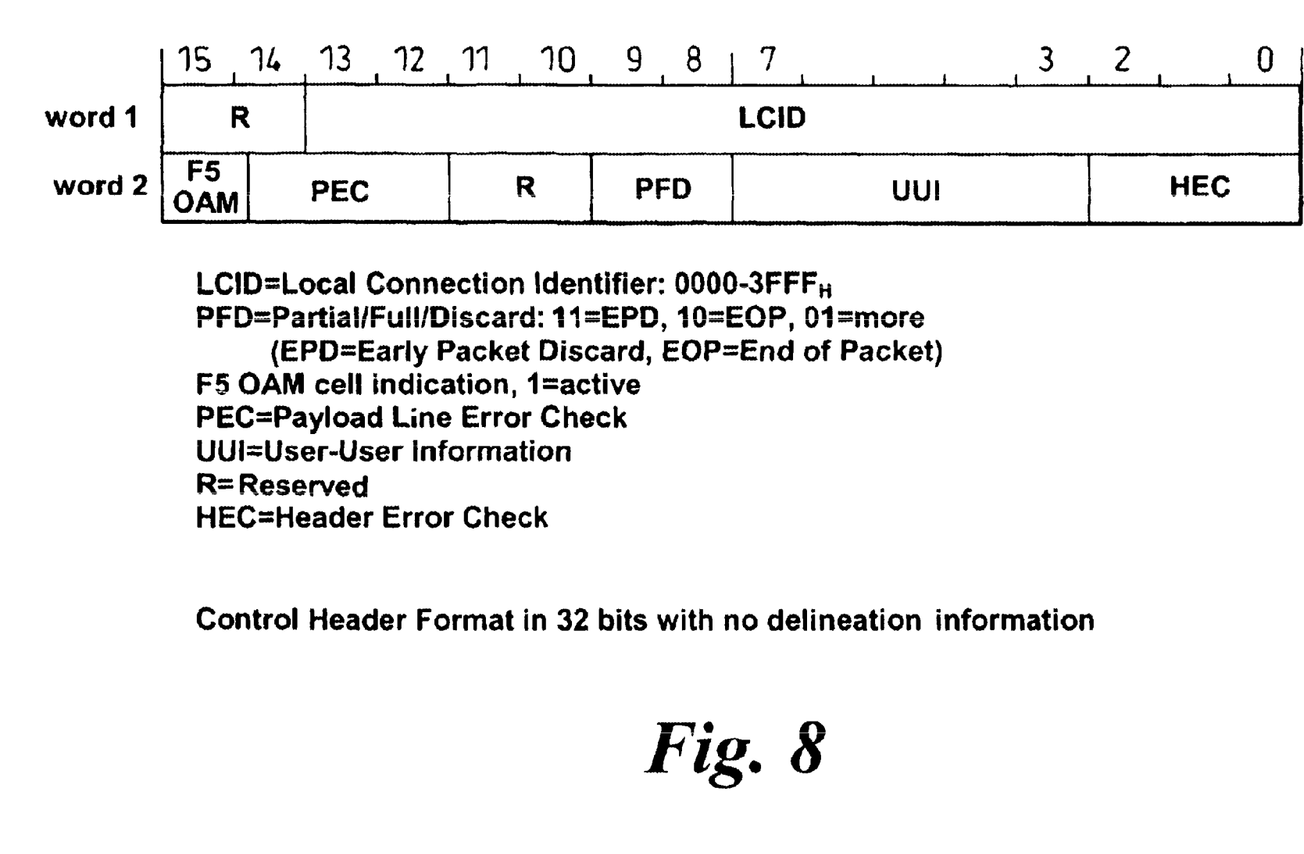
FIG. 8 shows a control header format.
Figure 10:
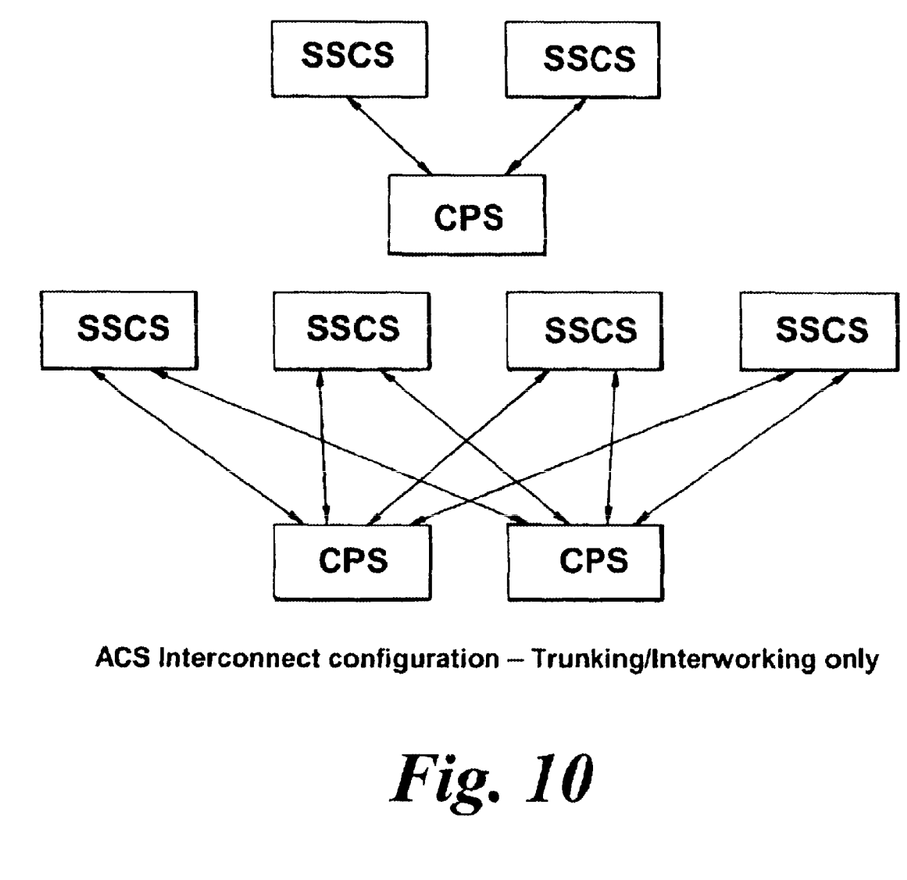
FIG. 10 shows an interconnect configuration for trunking/interworking.
Figure 11:
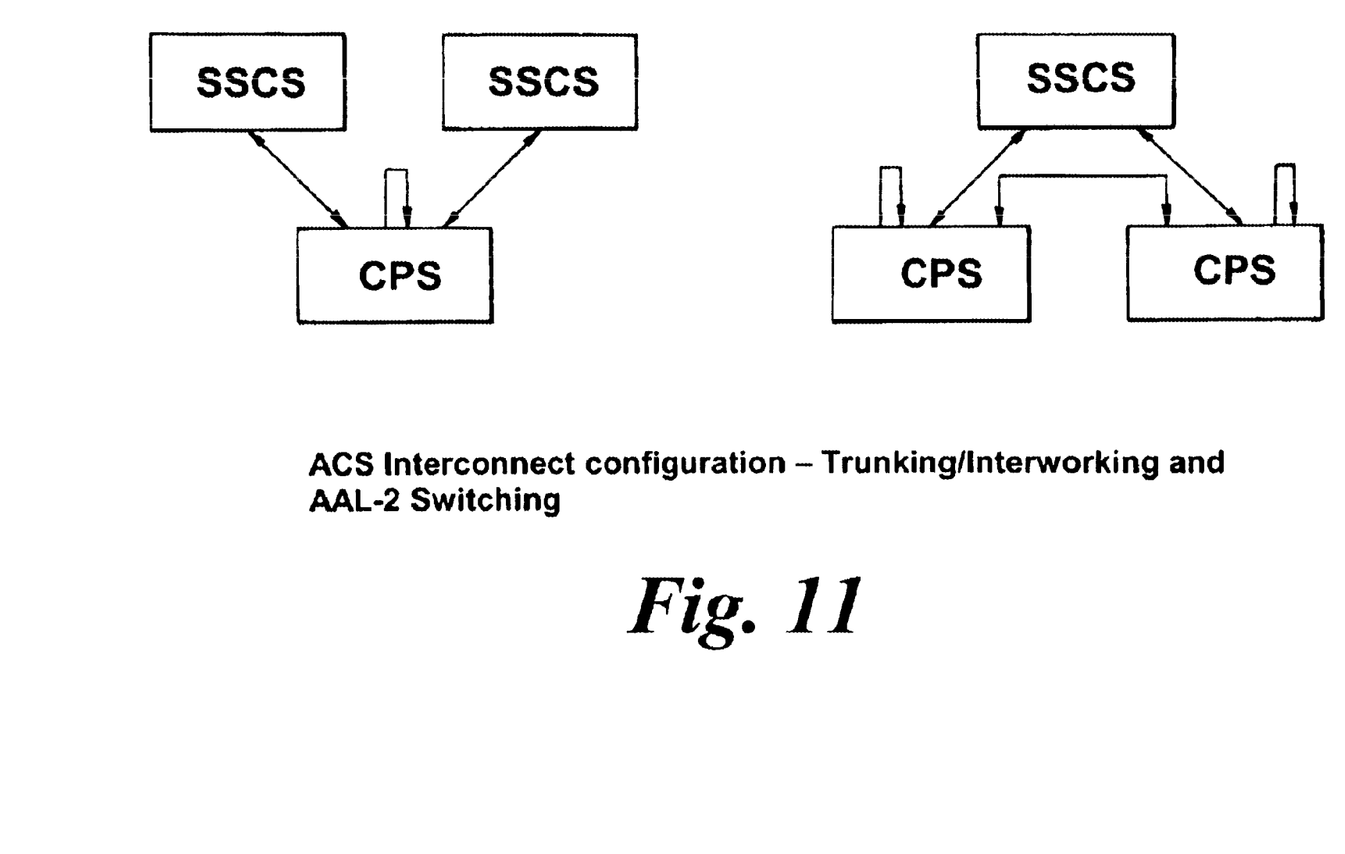
FIG. 11 shows a further interconnect configuration.

A number of configurations of ACS devices and associated serial interconnects are envisaged depending on the application. For trunking/interworking both SSCS and CPS devices are required with connections between each SSCS device and each CPS device (FIG. 10). For AAL-2 switching, only CPS devices are required with a fully interconnected mesh from each CPS device to every other CPS device, including a connection from transmit to receive on each CPS device (FIG. 8). In some AAL-2 switching applications an SSCS data device handling OAM will also be provided requiring CPS-to-SSCS interconnect as well as CPS-to-CPS interconnect (FIG. 11).

Scheduling for Common Memory Access

The rules set out herein for how micro-packets are placed on a link allow m-packets to be of any payload length with gaps between m-packets similarly of any length.

Figure 9:
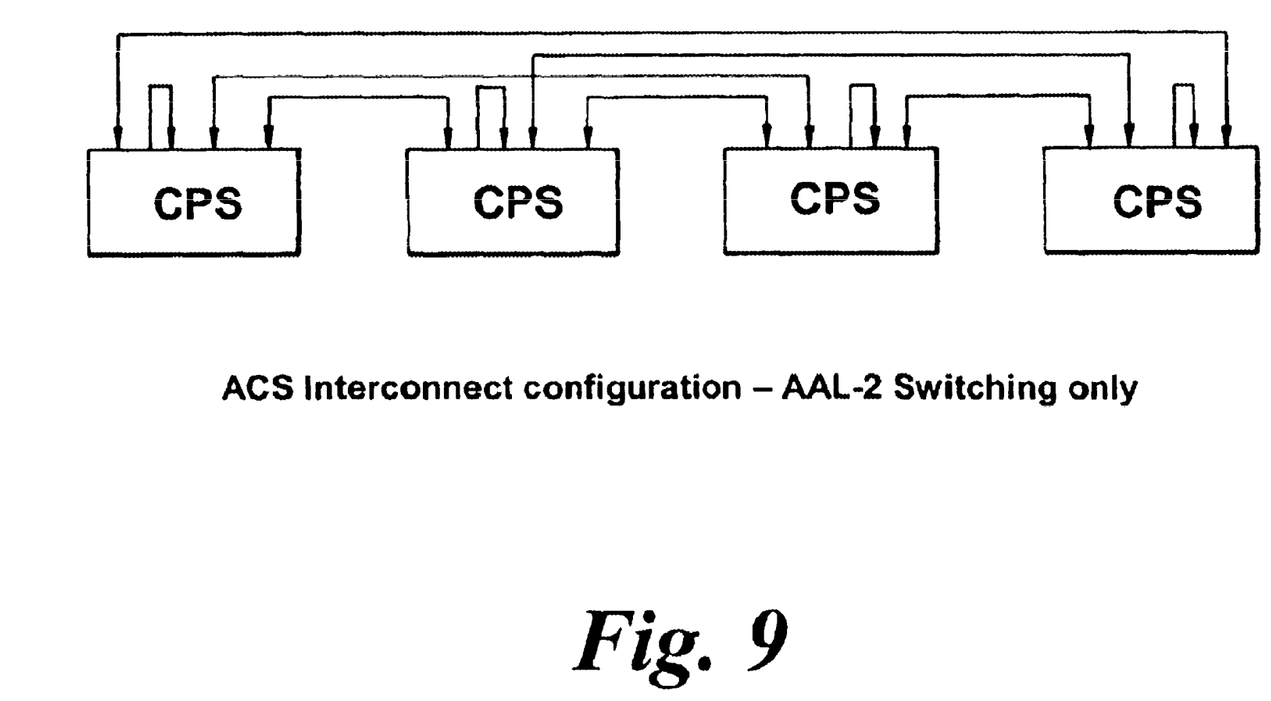
FIG. 9 shows a typical interconnect configuration for AAL2 switching.

All m-packet payload data when input into the CPS device is loaded into a common payload memory of which the write port has a data width of 32 bits (four bytes) and a clock rate of 77.76 MHz, the nominal byte rate of the serial interconnect. With four such interfaces, as required for example in the switching application shown in FIG. 9, the memory port provides one load cycle of four bytes per interface every four byte periods on the link. Thus this memory port has a bandwidth equal to that of four serial interfaces at 622.08 MHz provided that the data is presented in multiples of four bytes.

Figure 12:
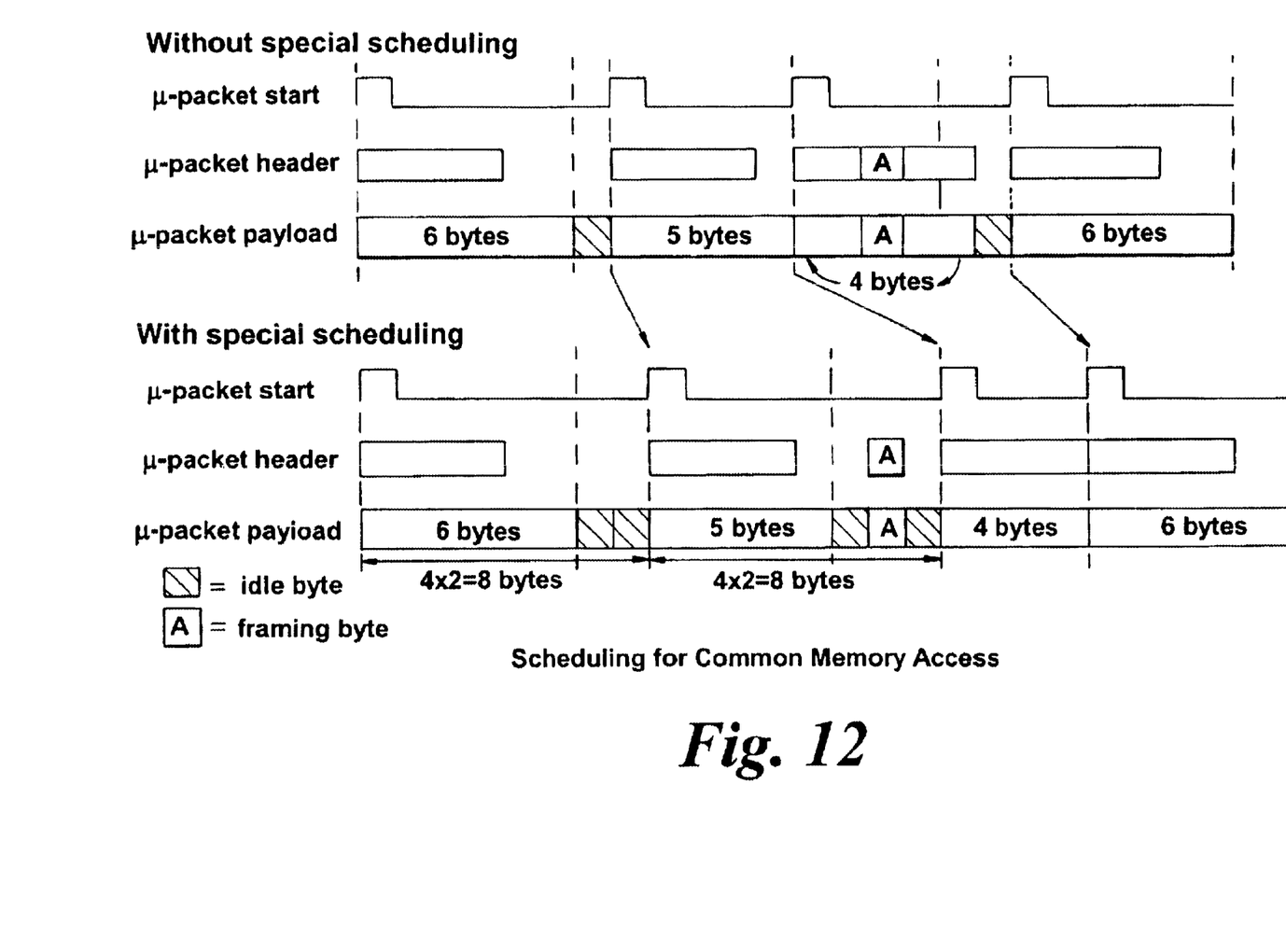
FIG. 12 illustrates a scheduling scheme for common memory access.

In the general case of loading m-packets with payloads of any length from four (or three) serial links into this common memory some restrictions must be imposed on the scheduling of m-packets on each link to ensure sufficient memory load cycles are available:

each m-packet payload must have zero to three idle bytes added on at the end to make a total of a multiple of four bytes from the start of the m-packet;

the next m-packet may start on any byte after the last added idle byte following the previous m-packet payload;

the number of added idle bytes may be reduced by the number of framing bytes which the idle bytes would otherwise have to straddle.

This is illustrated in FIG. 12.

With only two interfaces operating, however, no such scheduling restriction is needed, because the memory load cycles can be split so that each interface can have two load cycles every four byte periods on the link. This exceeds the requirement of the worst case of m-packets with a five byte payload abutting, that is two load cycles every five byte periods.

Timing

A clock signal at the serial bit rate (of nominally 622.08 MHz) sent in parallel with the data signals is capable of clocking the data directly at the receiving end.

A clock at a sub-multiple of the serial bit rate, say one quarter, can be sent in parallel with the data signals. The full rate clock is regenerated by a PLL per link in the receiver. The position of the non-clocking edge could be varied to indicate a three-state signal every four bits.

Framing bytes may be added as overhead to each data line which would guarantee timing content on each line. Timing/phase extraction circuitry would be required in the receiver for each line.

This could facilitate longer links, e.g. across a backplane or between shelves in a rack, where the skew between parallel data lines could become too great for the shared clocking arrangement of the preferred embodiment.

Byte Alignment

A delineation signal, e.g. start of m-packet, which only changes on byte boundaries is sent on a separate dedicated line.

A delineation signal which only changes on byte boundaries is conveyed by the three-state signal of the clock signal (Timing option 2) in the first four bits of each byte.

Framing bytes may be added as overhead to each data line, (Timing option 3), which would indicate a byte boundary unambiguously.

Micro-Packet Delineation

Two delineation signals, e.g. 'm-packet start' (dS) and 'm-packet payload present' (dP), are sent on their own dedicated lines in parallel with lines for control and payload.

The three used states of the delineation signals, start of m-packet, rest of m-packet (payload), and idle, as discussed above, are conveyed by the three-state signal of the pulse-width modulated clock line (Timing option 2).

A single delineation signal, e.g. 'm-packet start', is sent on its own dedicated line in parallel with lines for control and payload, while the control line carries the other information necessary for delineation:

'm-packet start' signal on separate line with explicit six-bit m-packet payload length field (for a max. 64-byte length) in the header; or 'm-packet start' signal on separate line with bytes following header on control line indicating payload or 'idle' on the payload line, plus a two-bit field in header indicating length of payload less than four bytes; or as in ii) above but with a 1-bit field in header indicating whether the payload is less than four bytes, and the actual short payload length carried by a special byte on payload line aligned to fourth byte of header; or as in ii) above but short payload length indicated by code modifying the 'm-packet start' line during the four header bytes.

With byte alignment found by framing overhead bytes, (Byte Alignment option 3), one or two bits are stolen every byte from the control line and used for signals equivalent to the signals on the separate lines. The number of bits in the m-packet header reduces from 32 to 28 or 24.

With byte alignment found by framing overhead bytes, ( Byte Alignment option 3), one overhead byte per frame carries an offset indication:

a six-bit offset points to the next start of m-packet or an 'idle' byte, a six-bit payload length field is required in the m-packet header, one LCID code is reserved to indicate an 'idle' byte; or a three-bit five-state offset signal points to the next start of m-packet, if present in the immediately following four bytes, or a control line byte indicating whether the byte is payload or 'idle' and whether the next byte is the start of the next m-packet or another similar control byte.

Use of Payload and Control Lines

A further possibility is to combine the function of the two lines designated payload and control in the preferred embodiment into a single logical line at twice the bit rate, nominally 1244.16 Mbit/s, carrying a 16-bit word every byte period. One line would carry the eight most significant bits (MSB), the other the eight least significant bits (LSB). A m-packet would be sent with the four-byte header first as two 16-bit words followed by the payload bytes grouped into 16-bit words.

This option increases the link bandwidth for m-packets with payload lengths ≧6 bytes. It can only be used with options for m-packet delineation which do not use the control line for anything other than the m-packet header.

Control Information

Only LCID for multiplexing, user SDU delineation, EPD, and AUUI are considered essential control information besides byte and m-packet delineation. The precise number of LCID bits required depends on system application. Other optional control information is fitted into the header bits available which depends on the byte and m-packet delineation option chosen.

It will be understood that the above description of a preferred embodiment is given by way of example only and that various modifications may be made by those skilled in the art without departing from the spirit and scope of the invention.

What is claimed is:

1. A serial interface for interfacing frame based communications traffic with a cell or packet based communications network, the interface comprising; means for segmenting the frame based traffic into micro-packets each consisting of a payload and a header containing control information, and means for transmitting said payload and control information in parallel over separate serial links.

2. A serial interface for interfacing communications traffic with a cell or packet based communications network, the interface comprising; a transmit unit, a receive unit, a first serial link and one or more further serial links therebetween, wherein the transmit unit has packetising means for packing the communications traffic into micro-packets, each having a header portion containing control information and a payload portion, first serial transmission means for transmitting the payload portion of each said micro-packet over the first serial line to the receive unit, and further transmission means for transmitting the control information in parallel with the payload information over the one or more further serial lines to the receive unit, and wherein the receive unit has means for receiving the transmitted payload and for relating the transmitted control information thereto.

3. A serial interface as claimed in claim 2, wherein each said micro-packet comprises a four-byte header and one or more packet payload bytes.

4. A serial interface as claimed in claim 3, wherein it incorporates a timing clock at a sub-multiple of the system bit rate by which said relating of the transmitted payload and control information is effected.

5. An interface arranged to convey variable length voice and data information packets between processing devices in an asynchronous adaptation arrangement, wherein the voice and data information packets are conveyed in a serial manner within micro-packets whereby to obviate the use of null or padding data.

6. A method of conveying variable length voice and data information packets over an interface between processing devices in an asynchronous adaptation arrangement, wherein the voice and data information packets are conveyed in a serial manner within micro-packets whereby to obviate the use of null or padding data.

7. A method of interfacing frame based communication traffic with a cell or packet based communications network, the method comprising segmenting the frame based communications traffic into micro-packets each a consisting of a payload and a header containing control information, and transmitting said payload and control information in parallel over separate serial lines.

8. A method of interfacing communications traffic with a cell or packet based communications network, the interface comprising; a transmit unit, a receive unit, a first serial line and one or more further serial lines therebetween, wherein the method comprises packetising the communications traffic into micro-packets, each having a header portion containing control information and a payload portion, transmitting the payload portion of each said micro-packet over the first serial line to the receive unit, transmitting the control information in parallel with said payload transmission over said one or more further serial lines and at the receive unit receiving the transmitted payload and relating the transmitted control information.

9. A method as claimed in claim 8, wherein said control information comprises micro-packet delineation signals and a cyclic redundancy check sum.

10. A method as claimed in claim 9, wherein said delineation signals incorporate an indication of presence or absence of a payload in the micro-packet.

11. A method as claimed in claim 10 wherein each said micro-packet comprises a four-byte header and one or more packet payload bytes.

12. A method as claimed in claim 11, wherein said micro-packet header incorporates a local channel identifier whereby to distinguish packets of multiple simultaneous connections.

13. A method as claimed in claim 12, wherein said parallel transmission of control and payload information is synchronized via a clock signal at a sub-multiple of the system bit rate.

14. A method as claimed in claim 13, and including detecting cell loss resulting in an incomplete service data unit, and sending a further micro-packet containing an indicator to discard previous micro-packets relating to that service data unit.

15. A method as claimed inn claim 14, wherein said transmitted payloads are assembled into ATM cells.

16. A method as claimed in claim 15, wherein said communications traffic comprises frame based voice traffic.

* * * * *